US009779125B2

(12) United States Patent
Gupta

(10) Patent No.: US 9,779,125 B2
(45) Date of Patent: Oct. 3, 2017

(54) ENSURING ACCURATE DOMAIN NAME CONTACT INFORMATION

(71) Applicant: Go Daddy Operating Company, LLC, Scottsdale, AZ (US)

(72) Inventor: Nitin Gupta, Mountain View, CA (US)

(73) Assignee: GO DADDY OPERATING COMPANY, LLC, Scottsdale, AZ (US)

(*) Notice: Subject to any disclaimer, the term of this patent is extended or adjusted under 35 U.S.C. 154(b) by 336 days.

(21) Appl. No.: 14/541,659

(22) Filed: Nov. 14, 2014

(65) Prior Publication Data

US 2016/0140158 A1  May 19, 2016

(51) Int. Cl.
G06F 17/30 (2006.01)
H04L 29/08 (2006.01)
H04L 29/12 (2006.01)

(52) U.S. Cl.
CPC ........ *G06F 17/30345* (2013.01); *H04L 67/02* (2013.01); *H04L 67/36* (2013.01); *H04L 61/302* (2013.01)

(58) Field of Classification Search
CPC . G06F 17/30345; H04L 61/302; H04L 67/02; H04L 67/36
See application file for complete search history.

(56) References Cited

U.S. PATENT DOCUMENTS

| | | |
|---|---|---|
| 6,334,132 B1 | 12/2001 | Weeks |
| 6,446,133 B1 | 9/2002 | Tan et al. |
| 6,480,508 B1 | 11/2002 | Mwikalo et al. |
| 6,687,746 B1 | 2/2004 | Shuster et al. |
| 6,876,997 B1 | 4/2005 | Rorex et al. |
| 6,880,007 B1 | 4/2005 | Gardos et al. |
| 6,976,090 B2 | 12/2005 | Ben-Shaul et al. |
| 7,069,323 B2 | 6/2006 | Gardos et al. |
| 7,076,541 B1 | 7/2006 | Burstein et al. |
| 7,099,956 B2 | 8/2006 | Shuster et al. |
| 7,136,932 B1 | 11/2006 | Schneider |

(Continued)

FOREIGN PATENT DOCUMENTS

JP 2001167017 6/2001

OTHER PUBLICATIONS

Fusu introduces Domain Stock Exchange in private beta, http://www.domainnamenews.com/domain-sales/fusuintroduces-domain-stock-exchange-in-private-beta/885, Oct. 17, 2007.

(Continued)

*Primary Examiner* — Dinku Gebresenbet
(74) *Attorney, Agent, or Firm* — Quarles & Brady LLP

(57) ABSTRACT

Systems and methods of the present invention provide for one or more server computers communicatively coupled to a network and configured to: identify a first contact data and a second contact data associated with at least one domain name stored in a database communicatively coupled to the network; a user interface may be displayed, allowing a user to select the first contact data or a second contact data, and the server may then: receive a selection of the first contact data to be associated with the at least one domain name; disassociate the second contact data from the at least one domain name; and update a plurality of domain names, comprising the first domain name, to be associated with the first contact data.

15 Claims, 13 Drawing Sheets

(56) References Cited

U.S. PATENT DOCUMENTS

| | | |
|---|---|---|
| 7,167,904 B1 | 1/2007 | Devarajan et al. |
| 7,238,661 B2 | 7/2007 | Glynn et al. |
| 7,287,002 B1 | 10/2007 | Asher et al. |
| 7,289,971 B1 | 10/2007 | O'Neil et al. |
| 7,296,026 B2 | 11/2007 | Patrick et al. |
| 7,299,491 B2 | 11/2007 | Shelest et al. |
| 7,319,992 B2 | 1/2008 | Gaos |
| 7,346,899 B2 | 3/2008 | Ebro et al. |
| 7,386,438 B1 | 6/2008 | Franz et al. |
| 7,400,981 B1 | 7/2008 | Rigney |
| 7,467,140 B2 | 12/2008 | Monroe |
| 7,472,160 B2 | 12/2008 | King et al. |
| 7,493,403 B2 | 2/2009 | Shull et al. |
| 7,542,969 B1 | 6/2009 | Rappaport et al. |
| 7,565,402 B2 | 7/2009 | Schneider |
| 7,657,436 B2 | 2/2010 | Elmore et al. |
| 7,668,119 B2 | 2/2010 | Thubert et al. |
| 7,680,819 B1 | 3/2010 | Melimer et al. |
| 7,689,458 B2 | 3/2010 | Heckerman et al. |
| 7,698,425 B2 | 4/2010 | Thayer et al. |
| 7,698,426 B2 | 4/2010 | Thayer et al. |
| 7,711,850 B2 | 5/2010 | Ronen et al. |
| 7,711,851 B2 | 5/2010 | Ronen et al. |
| 7,725,602 B2 | 5/2010 | Liu et al. |
| 7,734,745 B2 | 6/2010 | Gloe |
| 7,761,565 B2 | 7/2010 | Adelman et al. |
| 7,761,566 B2 | 7/2010 | Adelman et al. |
| 7,788,130 B2 | 8/2010 | Feeley et al. |
| 7,805,379 B1 | 9/2010 | Adkins, III et al. |
| 7,805,426 B2 | 9/2010 | Leung et al. |
| 7,822,868 B2 | 10/2010 | Gassewitz et al. |
| 7,877,432 B2 | 1/2011 | Maxson et al. |
| 7,890,369 B2 | 2/2011 | Mooney |
| 7,917,389 B2 | 3/2011 | Mooney |
| 7,953,812 B2 | 5/2011 | Ruiz |
| 7,953,813 B2 | 5/2011 | Ruiz |
| 7,962,438 B2 | 6/2011 | Adelman et al. |
| 8,015,006 B2 | 9/2011 | Kennewick et al. |
| 8,024,428 B2 | 9/2011 | Adelman et al. |
| 8,037,168 B2 | 10/2011 | Schneider |
| 8,069,187 B2 | 11/2011 | Adelman et al. |
| 8,156,180 B2 | 4/2012 | Adelman |
| 8,171,070 B2 | 5/2012 | Zimmerman et al. |
| 8,171,110 B1 | 5/2012 | Parsons et al. |
| 8,195,652 B1 | 6/2012 | Parsons et al. |
| 8,209,379 B2 | 6/2012 | Adelman |
| 8,234,351 B2 | 7/2012 | Curran et al. |
| 8,280,952 B1 | 10/2012 | Parsons et al. |
| 8,370,217 B1 | 2/2013 | Parsons et al. |
| 8,380,800 B2 | 2/2013 | Ruiz |
| 8,515,969 B2 | 8/2013 | Nicks et al. |
| 2001/0039543 A1 | 11/2001 | Mann et al. |
| 2002/0010795 A1 | 1/2002 | Brown |
| 2002/0026439 A1 | 2/2002 | Monroe |
| 2002/0040301 A1 | 4/2002 | Royall, Jr. et al. |
| 2002/0091827 A1 | 7/2002 | King et al. |
| 2002/0138291 A1 | 9/2002 | Vaidyanathan et al. |
| 2002/0152206 A1 | 10/2002 | Gusler et al. |
| 2002/0161745 A1* | 10/2002 | Call ................... A61L 2/10 707/999.001 |
| 2002/0173981 A1 | 11/2002 | Stewart |
| 2002/0178383 A1 | 11/2002 | Hrabik et al. |
| 2002/0184172 A1 | 12/2002 | Shlain et al. |
| 2003/0037131 A1 | 2/2003 | Verma |
| 2003/0120649 A1 | 6/2003 | Uchino et al. |
| 2003/0132967 A1 | 7/2003 | Gangadharan |
| 2003/0177274 A1 | 9/2003 | Sun |
| 2003/0182365 A1 | 9/2003 | Toda et al. |
| 2003/0182573 A1 | 9/2003 | Toneguzzo et al. |
| 2004/0064561 A1 | 4/2004 | Parsons et al. |
| 2004/0068436 A1 | 4/2004 | Boubek et al. |
| 2004/0078490 A1 | 4/2004 | Anderson et al. |
| 2004/0083306 A1 | 4/2004 | Gloe |
| 2004/0093331 A1 | 5/2004 | Garner et al. |
| 2004/0098375 A1 | 5/2004 | DeCarlo, III |
| 2004/0102197 A1 | 5/2004 | Dietz |
| 2004/0133644 A1 | 7/2004 | Warren et al. |
| 2004/0148238 A1 | 7/2004 | Bookstaff et al. |
| 2004/0162742 A1 | 8/2004 | Stoker et al. |
| 2004/0162895 A1 | 8/2004 | Mok et al. |
| 2004/0250109 A1 | 12/2004 | Draughon et al. |
| 2005/0021588 A1 | 1/2005 | Zimmerman et al. |
| 2005/0055299 A1 | 3/2005 | Chambers et al. |
| 2005/0080786 A1 | 4/2005 | Fish et al. |
| 2005/0144323 A1 | 6/2005 | Gardos et al. |
| 2005/0144520 A1 | 6/2005 | Tuma et al. |
| 2005/0198095 A1 | 9/2005 | Du et al. |
| 2005/0216290 A1 | 9/2005 | Sachs et al. |
| 2005/0234363 A1 | 10/2005 | Xue |
| 2005/0268237 A1 | 12/2005 | Crane et al. |
| 2005/0273344 A1 | 12/2005 | Lee et al. |
| 2005/0289242 A1 | 12/2005 | Ruiz |
| 2006/0031330 A1 | 2/2006 | Ruiz |
| 2006/0059136 A1 | 3/2006 | Wooldridge et al. |
| 2006/0101113 A1 | 5/2006 | Lemson et al. |
| 2006/0101155 A1 | 5/2006 | Damour et al. |
| 2006/0106793 A1 | 5/2006 | Liang |
| 2006/0112176 A1 | 5/2006 | Liu et al. |
| 2006/0122889 A1 | 6/2006 | Burdick et al. |
| 2006/0136908 A1 | 6/2006 | Gebhart et al. |
| 2006/0155656 A1 | 7/2006 | Kreder, III et al. |
| 2006/0157560 A1 | 7/2006 | Skor et al. |
| 2006/0161681 A1 | 7/2006 | King et al. |
| 2006/0168020 A1 | 7/2006 | Brennan, III |
| 2006/0171523 A1 | 8/2006 | Greenwell |
| 2006/0184620 A1 | 8/2006 | Melet et al. |
| 2006/0212931 A1 | 9/2006 | Shull et al. |
| 2006/0248190 A1* | 11/2006 | Gardos ................ H04L 29/12 709/225 |
| 2006/0287936 A1 | 12/2006 | Jacobson |
| 2007/0061336 A1 | 3/2007 | Ramer et al. |
| 2007/0067465 A1 | 3/2007 | Blinn et al. |
| 2007/0083423 A1 | 4/2007 | Delbridge |
| 2007/0094365 A1 | 4/2007 | Nussey et al. |
| 2007/0174255 A1 | 7/2007 | Sravanapudi et al. |
| 2007/0174630 A1 | 7/2007 | Shannon et al. |
| 2007/0208740 A1 | 9/2007 | Nye |
| 2007/0214284 A1 | 9/2007 | King et al. |
| 2007/0287473 A1 | 12/2007 | Dupray |
| 2007/0294431 A1 | 12/2007 | Adelman et al. |
| 2007/0299682 A1 | 12/2007 | Roth et al. |
| 2007/0299815 A1 | 12/2007 | Starbuck et al. |
| 2008/0005127 A1 | 1/2008 | Schneider |
| 2008/0005312 A1 | 1/2008 | Boss et al. |
| 2008/0005342 A1 | 1/2008 | Schneider |
| 2008/0016142 A1 | 1/2008 | Schneider |
| 2008/0034211 A1 | 2/2008 | Shull et al. |
| 2008/0040329 A1 | 2/2008 | Cussen et al. |
| 2008/0065974 A1 | 3/2008 | Campbell |
| 2008/0133580 A1 | 6/2008 | Wanless et al. |
| 2008/0198162 A1 | 8/2008 | Ni |
| 2008/0201258 A1 | 8/2008 | D'Ambrosio |
| 2008/0201487 A1 | 8/2008 | Blinn et al. |
| 2008/0235383 A1 | 9/2008 | Schneider |
| 2008/0313229 A1 | 12/2008 | Taswell |
| 2009/0063451 A1 | 3/2009 | Bennett |
| 2009/0119198 A1 | 5/2009 | Manriquez et al. |
| 2009/0125308 A1 | 5/2009 | Ambler |
| 2009/0133580 A1 | 5/2009 | Geurtz |
| 2009/0164598 A1 | 6/2009 | Nelson et al. |
| 2009/0171678 A1 | 7/2009 | Zimmerman et al. |
| 2009/0171823 A1 | 7/2009 | Zimmerman et al. |
| 2009/0177549 A1 | 7/2009 | Ruiz |
| 2009/0182884 A1 | 7/2009 | Datta et al. |
| 2009/0210417 A1 | 8/2009 | Bennett |
| 2009/0216577 A1 | 8/2009 | Killebrew |
| 2009/0222368 A1 | 9/2009 | McCauley et al. |
| 2009/0240835 A1 | 9/2009 | Adelman et al. |
| 2009/0254545 A1 | 10/2009 | Fisken |
| 2009/0254572 A1 | 10/2009 | Redlich et al. |
| 2009/0265415 A1 | 10/2009 | Harry |
| 2009/0292696 A1 | 11/2009 | Shuster |
| 2009/0307256 A1 | 12/2009 | Tiyyagura |
| 2010/0030680 A1 | 2/2010 | Malackowski et al. |

(56) References Cited

U.S. PATENT DOCUMENTS

| | | |
|---|---|---|
| 2010/0037314 A1 | 2/2010 | Perdisci et al. |
| 2010/0042688 A1 | 2/2010 | Maghraby |
| 2010/0057484 A1 | 3/2010 | Adelman |
| 2010/0058209 A1 | 3/2010 | Adelman |
| 2010/0058210 A1 | 3/2010 | Johnson |
| 2010/0083350 A1 | 4/2010 | Cornelius |
| 2010/0114879 A1 | 5/2010 | Zhong et al. |
| 2010/0115043 A1 | 5/2010 | King et al. |
| 2010/0145678 A1 | 6/2010 | Csomai et al. |
| 2010/0146001 A1 | 6/2010 | Lee |
| 2010/0146119 A1 | 6/2010 | Lee |
| 2010/0169492 A1 | 7/2010 | Lee |
| 2010/0223143 A1 | 9/2010 | Lee |
| 2010/0223278 A1 | 9/2010 | Lee |
| 2010/0274668 A1 | 10/2010 | Langston et al. |
| 2010/0287254 A1 | 11/2010 | Ruiz |
| 2010/0287484 A1 | 11/2010 | Ruiz |
| 2011/0087769 A1 | 4/2011 | Holmes et al. |
| 2011/0282988 A1 | 11/2011 | Wang et al. |
| 2012/0041842 A1 | 2/2012 | Adelman et al. |
| 2012/0278467 A1* | 11/2012 | Schneider .............. G06Q 30/02 709/223 |
| 2013/0173497 A1 | 7/2013 | Gould et al. |
| 2014/0188871 A1 | 7/2014 | Bushlack et al. |

OTHER PUBLICATIONS

Dnxpert, Fusu Domain Stock Exchange in Beta, http://www.dnxpert.com/2007/10/18/fusu-domain-stock-exchange-in-beta/.
Moffat, RSS—A Primer for Publihsers & Content Proivders, p. 3, Aug. 20, 2003.
Ramaswamy Chandramouli and Scott Rose "Challenges in Securing the Domain Name System", IEEE Security & Privacy, 2006, pp. 84-87.
Board of Patent Appeals and Interferences, Decision on Appeal for U.S. Appl. No. 10/407,778 decided Sep. 25, 2008.
Business EditorslHigh Tech Writers "Network Solutions' Affiliate Program to Offer Expanded Internet Identity Services Through Storefront", Business Wire, May 11, 2000, p. 1.
Register.com to Issue Baltimore Digital Certificates Making e-Security Accessible to All e-Businesses, Nov. 20 2008, Register.com, p. 1.
Go Daddy, Oct. 14, 2007, pp. 1-371, http://web.archive.org/20071011054029/http://help.godaddy.com/article.php?article_id=1122.
You Can Use Gmail for Your Domain, Mar. 2009, Christian Computing Magazine.
"Domain name Hijacking: Incidents, Threats, Risks, and Remedial Actions", A Report from the ICANN Security and Stability Advisory Committee, pp. 1-48, Jul. 2005.
Van Couvering, DomainsBot Investigation#2, Jan. 22, 2006, pp. 1-6.
EstiBot.com User's Guide, Feb. 4, 2010, pp. 1-22.
Nameboy Ultimate Domain Name Generator, search, creation, domain name lookup and domain registration, Oct. 22, 2008 pp. 1-2.
Ohman, Watch Me Hand Register Keyword .com Domains Worth More than $100, Feb. 21, 2009, pp. 1-5.
Information retrieval—Wikipedia, the free encyclopedia, Nov. 10, 2009, pp. 1-8.
Laidlaw, What's Your Web Site Worth, May 7, 2008, pp. 1-22.
InterNIC, "InterNIC FAQs on the Domain Names, Registrars, and Registration." Sep. 25, 2003. http://www.internic.netlindex.html.
A Major Domain to be Sold at Auction on Oct. 30th—WebChat.com—Offers Premium Web Presence and Growth Opportunity in the Booming Online and Mobile Communications Industry. Anonymous. Oct. 10, 2008.
Staking a claim in cyberspace: [ONT Edition], Rider, David. Toronto Star [Toronto, Ont] Aug. 18, 2007: L 12. Downloaded from ProQuestDirect on the Internet on Mar. 11, 2013, 2 pages.
GoDaddy.com(R) Scores Stunning Super Bowl XL(R) Victory. PR Newswire [New York] Feb. 7, 2006: Downloaded from ProQuestDirect on the Internet on Mar. 11, 2013, 2 pages.
Sedo to host "Around the world in seven days" online Auction, PR Newswire, Europe Including UK, Feb. 11, 2008, downloaded from ProQuestDirect on the Internet on Mar. 11, 2013, 2 pages.
FR E ES E RVE RS (http://www.freeservers.comlWebHosting1 01 /HowDo IChooseADomain Name Registrar. htm 1) Nov. 30, 2007.
Xiaobai Cai, Xiaozhong Fan. Class-Based Smoothing to Estimate the Probability of Domain Terms. pp. 344-348. Year 2007.
GHG Internet Services, "Domain Name Registration Information", pp. 1 and 2, Jan. 2002.
Mockapetris, RFC 1035, Domain Names—Implementation and Specification, Nov. 1, 1987.
Network Solutions Launches Enhanced Business Listings, Nov. 26, 2007.
Final task force report on the purpose of Whois and of the Whois contacts, Mar. 15, 2006.

\* cited by examiner

ENSURING ACCURATE DOMAIN NAME CONTACT INFORMATION

FIELD OF THE INVENTION

The present inventions generally relate to the field of domain names and specifically to the field of ensuring accurate contact information associated with a domain name.

SUMMARY OF THE INVENTION

The present inventions provide methods and systems comprising one or more server computers communicatively coupled to a network and configured to: Identify a first contact data and a second contact data associated with at least one domain name stored in a database communicatively coupled to the network. A user interface may be displayed, allowing a user to select the first contact data or a second contact data. The server may: receive a selection of the first contact data to be associated with the at least one domain name; disassociate the second contact data from the at least one domain name; and update a plurality of selected domain names, comprising the first domain name, to be associated with the first contact data.

The present inventions may also provide methods and systems comprising the one or more server computers configured to: generate a code to verify a correspondence address associated with a geographical contact location for a domain name registrant; store the code in data storage 230 in association with a domain name, possibly registered by the registrant; retrieve a correspondence address within a domain name record for the domain name; generate a correspondence to be sent to the correspondence address including the code and a URL for accessing a user interface for entering the code; determine whether the code has been entered into the user interface; and if so, update the domain name record to include a status reflecting a verification of the correspondence address and a date of the verification.

The above features and advantages of the present invention will be better understood from the following detailed description taken in conjunction with the accompanying drawings.

DETAILED DESCRIPTION

Figure 1:
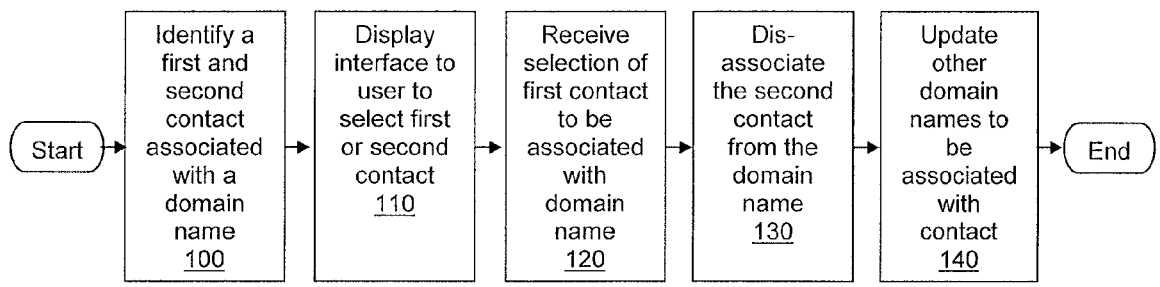
FIG. 1 is a flow diagram illustrating a possible embodiment of a method for ensuring accurate domain name contact information.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related web pages. Websites, unless extremely large and complex or have unusual traffic demands, typically reside on a single server and are prepared and maintained by a single individual or entity. Website browsers are able to locate specific websites because each website, resource, and computer on the Internet has a unique Internet Protocol (IP) address.

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses.

Registered domain names may be associated with contact information for each registrant that registers a domain name. Often, when a registrant registers a domain name, the registrar's user interface will collect contact data about the registrant (possibly for WHOIS purposes, discussed below), and store the registrant's contact data in a one-to-one relationship with the domain name's registration data in the registrar's database.

This one-to-one relationship between the registration data and the contact data may be effective while the number of contacts and domain names is small, but as each new redundant contact data is entered, there is a greater likelihood of error (e.g., typographical errors, inconsistent spellings or capitalization), which may cause ambiguity about whether the newly entered contact data is the same as a previously entered contact data, or whether the newly entered contact data is intended to be a new contact data associated with the registrant.

As noted above, WHOIS records may also be used to identifying and store registrant contact information. WHOIS records are generated and available via a transaction-oriented query/response protocol used to provide domain name registration information services to Internet users.

Example domain name registration information may be seen in the following simplified WHOIS record:
Registrant:
  Dns Admin
  Example Company Inc.
  Please contact contact-admin@example.com
  123 Example Parkway
  Mountain View Calif. 94043
  US
  dns-admin@example.com   +1.6502530000   Fax: +1.6506188571
  Domain Name: example.com
  Registrar Name: GoDaddy.com
  Registrar Whois: whois.godaddy.com
  Registrar Homepage: http://www.godaddy.com
Administrative Contact:
  DNS Admin
  Example Inc.
  123 Example Parkway
  Mountain View Calif. 94043
  US
  dns-admin@example.com   +1.6501234567   Fax: +1.6501234567
Technical Contact, Zone Contact:
  DNS Admin
  Example Inc.
  321 Example Street
  Mountain View Calif. 94043
  US
  dns-admin@example.com   +1.6507654321   Fax: +1.6507654321
Created on: Sep. 9, 2012.
Expires on: Sep. 13, 2032.
Record last updated on: Jan. 29, 2013.
Domain servers in listed order:
ns2.example.com
ns4.example.com
ns1.example.com
ns3.example.com In addition to the registrant's WHOIS data, the WHOIS record may also include additional contact data relevant to the domain name registration, such as administrative, technical, and billing information for the domain name.

The transparency into domain name ownership provided by WHOIS records, as well as the high value associated with some domain names, have caused some unscrupulous individuals to hijack the registration and control of domain names. Domain name hijacking or domain name theft can involve changing the registration of a domain name without the permission of its original registrant.

As non-limiting examples, a domain name hijacker may acquire personal information about the actual domain owner, possibly from WHOIS information, and impersonate them in order to persuade the domain registrar to modify the registration information and/or transfer the domain name to another registrar (the hijacker), who would then gain full control of the domain name.

To combat domain hijacking, domain name privacy services, such as GoDaddy's DOMAINS BY PROXY may be used to register domain names anonymously, so that the contact data is the registrar's, rather than the registrant's. While such services provide anonymity for their users, they may endanger the registrant's ownership or control of the domain name if the associated domain name registry requires verification of a physical addresses in a particular geographic location.

As a non-limiting example, the .nyc registry requires all domain name registrants to have a physical location in New York City or the surrounding boroughs. The ambiguity caused by listing the registrar's physical address in a different physical location may cause the registrant to forfeit its control of the domain name.

Thus, applicant has identified multiple weaknesses in presently existing methods and systems for registering domain names. One weakness may include the risk of losing a geographic-based domain name if a privacy service creates ambiguity in the registrant's physical address. Another weakness in presently existing methods and systems includes the one-to-one relationship between a registrant's registration data and contact data, which may create even more general ambiguity—existing methods and systems do not allow a registrant to identify each contact data as a single unique contact data that may be propagated consistently throughout all related domain registration and/or contact data.

Applicant has therefore identified methods that may improve on presently-existing systems and methods. Optimal systems and methods may include a system that verifies a single unique contact data for each user contact propagated throughout the existing registration and/or contact data, and displays verification of the contact information, including physical address and date, within updated documents associated with the domain name (e.g., WHOIS, DNS, zone records, registrar web pages, etc).

Such verification may be accomplished by providing a registrant means to access all contact data and registrant data on record for the registrant and select each unique and independent contact data from a plurality of contact data. The registrant may also select one or more domain names from the registration data to associate with one or more of the contacts.

Software running on one or more servers may receive the selections of each contact user, generate a single unique record for each contact data (if not already existing), and delete all redundancies and errors throughout the stored contact data. This single unique record for each stored contact may then be updated throughout all stored domain name registration data, possibly including associations with the domain names selected by the user.

As a non-limiting example, software may be displayed to the user, including a list of all stored contacts for the user and another list of all stored domain names registered to the user. Both lists may include checkboxes to select the respective contact or domain name. The user may then select the desired contacts and each contact to be associated with the selected domain names.

Several different methods may be used to provide and manage the present systems. FIG. 1 represents a flow diagram for one possible embodiment of the previously described improvements on presently existing systems. In this example embodiment, one or more server computers may be communicatively coupled to a network and operated by a hosting provider hosting a plurality of business websites. These server(s) may be configured to: Identify a first contact data and a second contact data associated with at least one domain name stored in a database communicatively coupled to the network (Step 100); a user interface may be displayed, allowing a user to select the first contact data or a second contact data (Step 110). The server may then: receive a selection of the first contact data to be associated with the at least one domain name (Step 120); disassociate the second contact data from the at least one domain name (Step 130); and update a plurality of domain names, comprising the first domain name, to be associated with the first contact data (Step 140).

Figure 14:
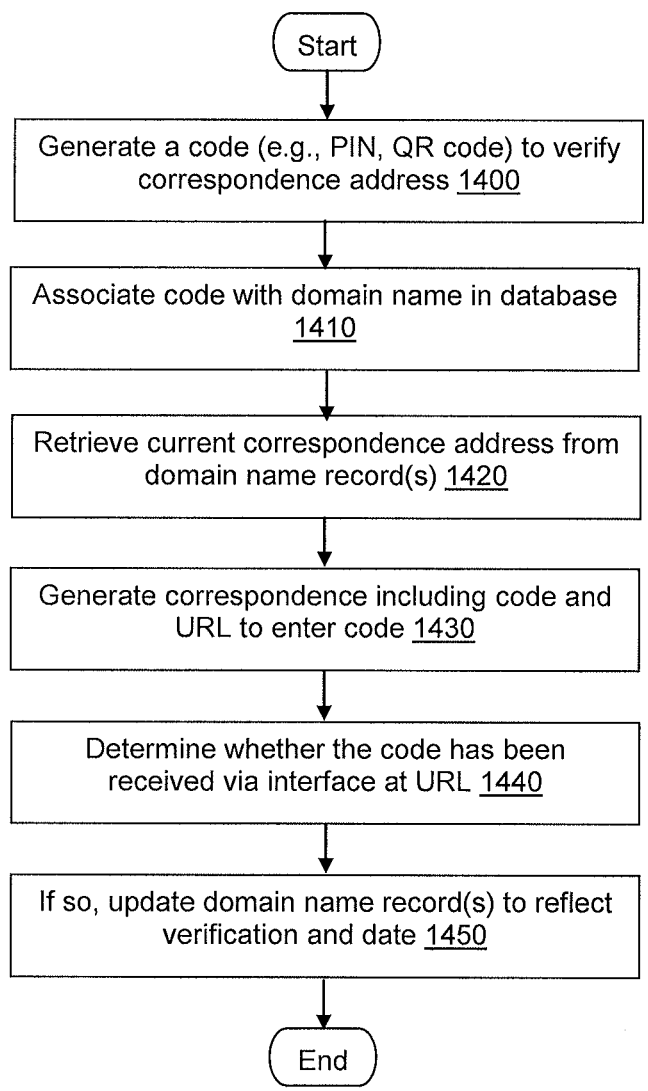
FIG. 14 is a flow diagram illustrating a possible embodiment of a method for ensuring accurate domain name contact information.

In other embodiments such as that shown in FIG. 14, the one or more server computers may be configured to: generate a code to verify a correspondence address associated with a geographical contact location for a domain name registrant (Step 1400); store the code in data storage in association with a domain name, possibly registered by the registrant (Step 1410); retrieve a correspondence address within a domain name record for the domain name (Step 1420); generate a correspondence to be sent to the correspondence address including the code and a URL for accessing a user interface for entering the code (Step 1430); determine whether the code has been entered into the user interface (Step 1440); and if so, update the domain name record to include a status reflecting a verification of the correspondence address and a date of the verification (Step 1450).

Figure 2:
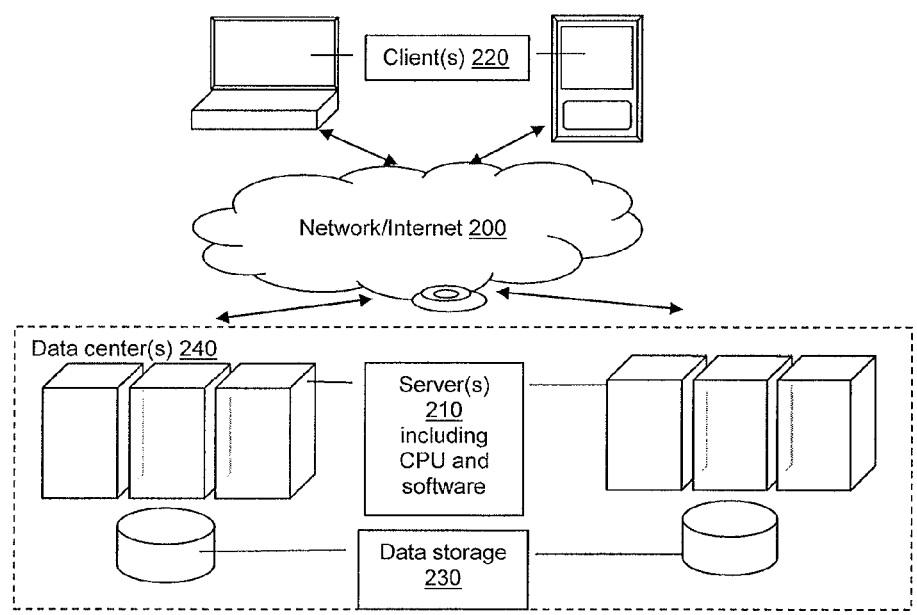
FIG. 2 illustrates a possible system for ensuring accurate domain name contact information.

Several different environments may be used to accomplish the method steps of embodiments disclosed herein. FIG. 2 demonstrates a streamlined example and FIG. 3 demonstrates a more detailed example of an environment including a system and/or structure that may be used to accomplish the methods and embodiments disclosed and described herein. Such methods may be performed by any central processing unit (CPU) in any computing system, such as a microprocessor running on at least one server 210 and/or client 220, and executing instructions stored (perhaps as scripts and/or software, possibly as software modules/components) in computer-readable media accessible to the CPU, such as a hard disk drive on a server 210 and/or client 220.

The example embodiments shown and described herein exist within the framework of a network 200 and should not limit possible network configuration or connectivity. Such a network 200 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 210 and at least one client 220 may be communicatively coupled to the network 200 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The example embodiments herein place no limitations on whom or what may comprise users. Thus, as non-limiting examples, users may comprise any individual, entity, business, corporation, partnership, organization, governmental entity, and/or educational institution that may have occasion to organize/import contacts and/or send marketing campaigns.

Server(s) 210 may comprise any computer or program that provides services to other computers, programs, or users either in the same computer or over a computer network 200. As non-limiting examples, the server 210 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 220.

The server 210 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The client 220 may be any computer or program that provides services to other computers, programs, or users either in the same computer or over a computer network 200. As non-limiting examples, the client 220 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 220. Non limiting example programming environments for client applications may include JavaScript/AJAX (client side automation), ASP, JSP, Ruby on Rails, Python's Django, PHP, HTML pages or rich media like Flash, Flex or Silverlight.

The client(s) 220 that may be used to connect to the network 200 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

The user interface displayed on the client(s) 220 or the server(s) 210 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces, Conversational Interface Agents, Live User Interfaces (LUI), Command line interfaces, Non-command user interfaces, Object-oriented User Interfaces (OOUI) or Voice user interfaces. The commands received within the software combination, or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 210 may be communicatively coupled to data storage 230 including any information requested or required by the system and/or described herein. The data storage 230 may be any computer components, devices, and/or recording media that may retain digital data used for computing for some interval of time. The storage may be capable of retaining stored content for any data required, on a single machine or in a cluster of computers over the network 200, in separate memory areas of the same machine such as different hard drives, or in separate partitions within the same hard drive, such as a database partition.

Non-limiting examples of the data storage 230 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 230 may comprise any collection of data. As non-limiting examples, the data storage 230 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The server(s) 210 or software modules within the server(s) 210 may use query languages such as MSSQL or MySQL to retrieve the content from the data storage 230. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

The software modules/components of the software combination used in the context of the current invention may be stored in the memory of—and run on—at least one server 210. As non-limiting examples of such software, the paragraphs below describe in detail the software modules/components that make up the software combination. These software modules/components may comprise software and/or scripts containing instructions that, when executed by a microprocessor on a server 210 or client 220, cause the microprocessor to accomplish the purpose of the module/component as described in detail herein. The software combination may also share information, including data from data sources and/or variables used in various algorithms executed on the servers 210 and/or clients 220 within the system, between each module/component of the software combination as needed.

A data center 240 may provide hosting services for the software combination, or any related hosted website including, but not limited to hosting one or more computers or servers in a data center 240 as well as providing the general infrastructure necessary to offer hosting services to Internet users including hardware, software, Internet web sites, hosting servers, and electronic communication means necessary to connect multiple computers and/or servers to the Internet or any other network 200.

Figure 3:
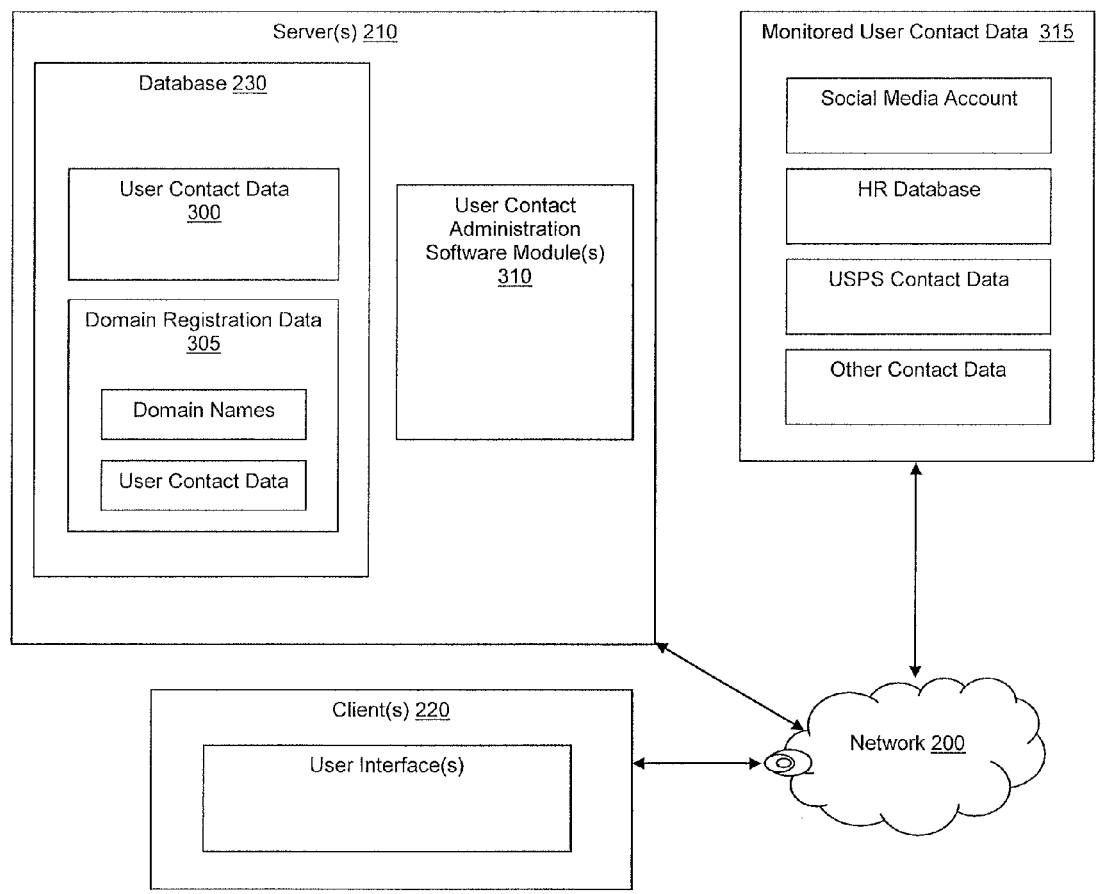
FIG. 3 illustrates a more detailed possible system for ensuring accurate domain name contact information.

FIG. 3 shows a more detailed example embodiment of an environment for accomplishing the systems and method steps disclosed herein. As non-limiting examples, all disclosed software modules may run on one or more server(s) 210 and may include one or more user interfaces generated by the server(s) 210 and transmitted to and displayed on the client(s) 220. The user interface(s) may be configured to receive input from the user and transmit this input to the server(s) 210 for the administration and execution of the software, using data in data storage 230 associated with the software modules.

As seen in FIG. 3, server(s) 210 may host and/or run one or more contact administration software modules 310, which may be configured to execute any or all of the method steps disclosed herein.

Server(s) 210 may be hosted by any entity, possibly a hosting provider, a domain name registrar, a website development company, any other software service provider or any combination thereof. To manage users of such a system, including individuals or organizations, server(s) 210 may host and run a user administration program such as GoDaddy's My Account control panel for managing hosting and domain names, as a non-limiting example.

In such an administration control panel program, or admin, each user may be assigned a user id. This user id may identify transactions performed by each user. These transactions may be stored as data records in data storage 230, each data record including the user id to associate the user with the transaction in the database. As non-limiting examples, transactions in the context of the disclosed inventions may include receiving and storing a user contact 300 and/or receiving a domain name registration data 305.

As seen in FIG. 3, server(s) 210 may host and/or store data for one or more contacts, stored as user contact data 300 and associated in data storage 230 with a user id. If the individual or organization associated with the user id is a domain name registrant, then data from the registration of the domain name may be stored as domain name registration data 305 in data storage 230. The domain registration data 305 may be associated with the user id and mapped to the user contact data 300.

The user contact data 300 may exist independent of the domain registration data 305. Domain registration data 305 may be associated with a user id and further mapped to a user contact data 300, but an important goal of the current invention is to include a unique instance of each user contact data 300 in data storage, thereby guaranteeing consistency between displayed contacts by propagating the contact data 300 throughout the system from a single unique contact data 300.

Thus, a single unique instance of each user contact data may exist in data storage 230, but may be associated with multiple domain name instances. Likewise, a single domain name instance may be associated with multiple unique contact instances.

The user data, user contact data 300 and domain name registration data 305 may be stored as user data records, contact data records and domain name data records respectively, possibly associated via joins within data storage 230. As a non-limiting example, data storage 230 may comprise a user data table, a user contacts data table and a domain registration data table.

The user data table may comprise the user id, possibly included in the user contact data records 300 and/or domain registration data records 305 to associate these records with the individual and/or organization. In some embodiments, the user data table may include data such as a username, password, API and/or other URL to access contacts data within a social media account for an individual or organization, or to access a Human Resources (HR) contacts database for an organization, in order to monitor and verify accurate user contact data 300, described in more detail herein.

The user contacts data table may comprise one or more individual and unique data records for each contact associated with a particular user id, possibly including information such as an organization name, a physical address (number, street, town, city, country), telephone number (cell, landline), a fax, a company URL (i.e., an address for a company home page), or an email address.

Each user may be associated with multiple contact data, as seen in the example WHOIS record above. As non-limiting examples, if the user is an organization, the user contact data 300 may include an administrative contact (possibly including a DNS admin), a technical contact, a domain name zone contact, a billing contact, etc. Each of these contacts may be unique and independent of each other and of any domain registration data 305 stored in data storage 230.

In some embodiments, logic within one or more contact administration software modules 310 may dynamically display a different contact information based on current daylight hours. As a non-limiting example, the user contact data 300 may comprise a contact data 300 for a technical contact in the United States, a technical contact in Japan and/or a Technical contact in Europe. The software logic may dynamically update any displayed contact information so that during daytime hours in the US, the US technical contact is displayed, during daytime hours in Japan, the Japan contact is displayed and so forth.

The domain name registration data table may comprise data stored in relation to each domain name registered by the user, each data record in the domain registration data table including the user id associated with the data record. As non-limiting examples, domain registration data 305 may comprise a domain name, a registrar, a registrar URL (i.e., a registrar homepage or domain name registration tool), additional WHOIS, DNS or zone record information, etc.

In some embodiments, domain registration data 305 may also comprise a user contact data 300 collected during the domain name registration. User contact data 300 stored with the domain registration data 305 may also exist from pre-existing domain registration data prior to integration of the disclosed system or as domain registration data 305 imported into the database, possibly during a domain name transfer from another register. This combined domain registration data 305 and user contact data 300 may be consolidated into independent contact data 300 using the methods disclosed herein.

In some embodiments, user contact data 300 and/or domain registration data 305 may be added to the data storage via a user manually entering the user contact data 300 and/or domain registration data 305 into a user interface.

In these or other embodiments, a user may want to compare all available user contact data 300 with all available domain registration data 305 to initially correlate and/or maintain the associations between the two. In these embodiments, the user may be presented with a list of user contact data 300 and another list of domain registration data 305. The user may select which domain registration data 300 to associate with which user contact data 305. As noted above, in some embodiments, each user contact data 300 in the list may include a checkbox for the user to select the contact data 300. Each domain registration data 305 may also have a checkbox, so that the user may select a plurality of domain registration data 305 to be applied to a plurality of user contact data 300. The user interface may also comprise means for the user to update any details of the contact information (e.g., text boxes allowing user to edit and/or insert contact information).

More granular embodiments may exist, where the user may select a single user contact data 300, possibly via a radio button, drop down, touch screen selection, etc., and may select, possibly via checkboxes, a plurality of domain registration data 305 to be associated with that user contact data 300. Conversely, other embodiments may exist where the user selects a single domain registration data 305 and associates multiple contacts with that domain name. These examples should in no way limit the possible combinations of displayed domain names that are associated with contacts and vice versa.

In embodiments where only one user contact data 300 is associated with the user id, no interface for associating the user contact data 300 with the domain registration data 305 is necessary, and all domain registration data 305 may be automatically associated with the single user contact data 300.

However, additional embodiments may include interfaces and the underlying software logic to capture all possible combinations of associating contact data 300 with domain name registration data 305. In one example embodiment, a user may be presented with an option to apply all user contact data 300 with all domain registration data 305. For example, if an organization knew it wanted to apply all of its known contacts (e.g., administration, technical, domains, billing contacts) to all of its registered domains, it may select this option on a user interface, and the selected options may be propagated throughout the contact data 300 and/or domain name registration data 305 stored in data storage.

Another example embodiment may include a more efficient means for an organization or a web professional for the organization to select the contact data 300 and/or domain name registration data 305 by groups, so that individual selections are not needed. As non-limiting examples, the contact data 300 may be displayed on the user interface in groups of common contact data 300 to be selected, and possibly consolidated. In other words, in order to consolidate several stored contacts into a single independent contact, the user may be presented with all contact data 300 including common data such as organization name, physical address data, email address, etc. The user may then select one or more of these contacts from the group to be propagated throughout the system.

Likewise, the domain name registration data 305 may also be displayed by groups of common domain name registration data 305 on the user interface to be selected. Non-limiting examples of groupings of domain name registration data 305 may include domain names with the same second level domain but a different top level domain (e.g., godaddy.com, godaddy.net, godaddy.org, etc.), domain names sharing a common IP address, domain names sharing a common MX record, etc.

The current invention may provide for consolidating a plurality of domain registration data 305 into unique and independent contact data 300 to be propagated throughout the system. However, user contact data 300 may be added to data storage 230 via external sources including, as non-limiting examples, importing contact data 300 collected during domain name registrations (e.g., user-entered WHOIS data) and/or synchronizing/importing user contact data 305 from an API, data feed or other network connection with a social media account or an HR department database. More specifically, contact administration software 310 may use the username, password, URL or other disclosed data above to access user contact data 300 stored in a social media account and/or listed in an HR database.

Contact administration software 310 may determine if at least one user contact data 305 associated with the user id exists in the disclosed system. If not, software may add the user contact data from the social media and/or HR data feed to data storage 230, and may associate it with the user id. If user contact data 305 already exists for the identified user, contact administration software 310 may determine if the social media and/or HR contact matches any stored user contacts 300.

If the social media or HR contact is an exact match, the system may proceed as normal. If contact administration software 310 determines that there are only minor differences between the social media and/or HR contact and a stored contact, the system may present the similar contacts to the user in order to determine the desired correct contact data 300 as described in association with alerts below.

In addition to the previously described contact data from external sources, domain registration data 305 may be imported from one or more additional external sources that have integrated the contact data 300 into the domain name registration data 305. Non limiting examples of such domain registration data 305 may include domain registration records received prior to implementation of the current invention and domain registration data 305 imported from other sources, such as during a domain name migration and/or transfer.

Figure 4:
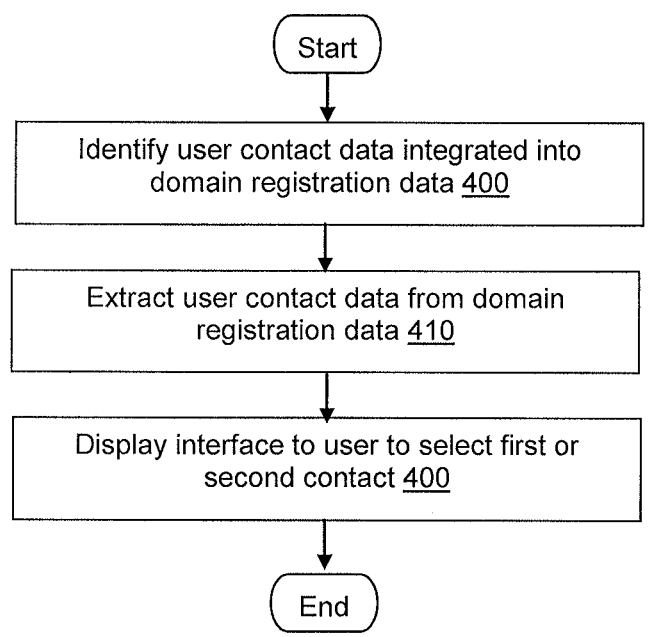
FIG. 4 is a flow diagram illustrating a possible embodiment of a method for ensuring accurate domain name contact information.

FIG. 4 is a flowchart outlining a possible method for consolidating user contact data 300 integrated into the domain registration data 305 and generating user contact data 300 independent of the domain registration data 305. In these embodiments, contact administration software 310 may identify user contact data 300 integrated into the domain registration data 305 (Step 400). Contact administration software may then extract the user contact data 300 from the domain registration data 305 (Step 410), and may generate a new independent user contact data 300 from data extracted from each domain registration data 305 (Step 420).

Figure 5:
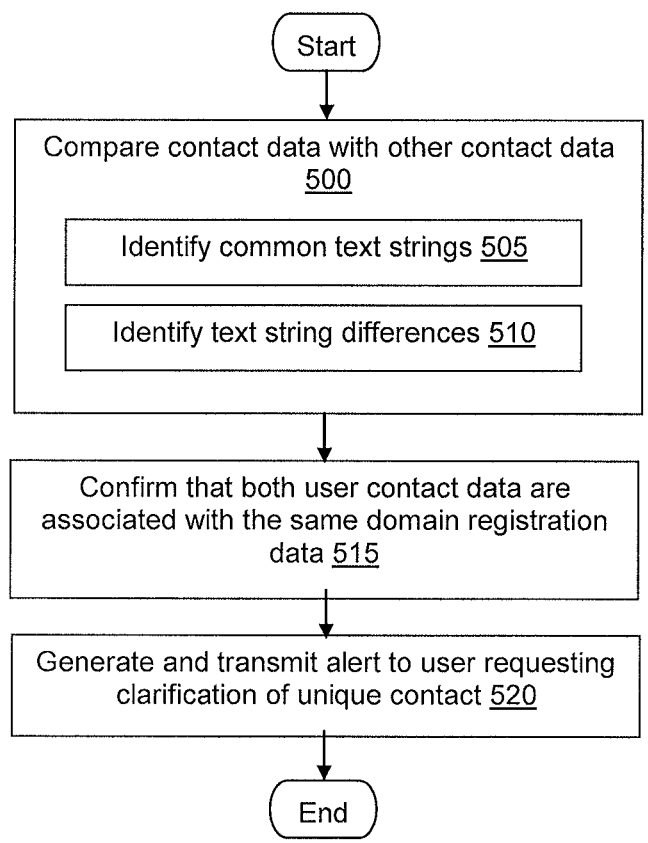
FIG. 5 is a flow diagram illustrating a possible embodiment of a method for ensuring accurate domain name contact information.
Figure 6:
FIG. 6 is a illustrates a user interface in a possible embodiment of a method for ensuring accurate domain name contact information.
Figure 7:
FIG. 7 is a illustrates a user interface in a possible embodiment of a method for ensuring accurate domain name contact information.

FIG. 5 is a flowchart outlining a possible method for identifying two possible redundant contacts and confirming, with the user, which user contact data 300 should be the unique and independent user contact data 300 stored in data storage 230.

In all embodiments, including both user-generated, external resources generated, and extracted user contact data 300, each user contact data 300 may be compared with each other user contact data 300 in order to identify redundancies and/or errors (e.g., typographical or other errors) with the user contact data 300, thereby ensuring that each stored user contact data 300 comprises only correct data (Step 500) to be propagated throughout the system.

Contact administration software 310 may analyze and compare each user contact data 300 and compare it against each other user contact data 300, searching for identical or common text strings (Step 505). Common text strings may comprise, but are not limited to, any text string with similar but inconsistent information.

As a non-limiting example, contact administration software 310 may analyze and compare two user contact data records and determine that the company, street address, state and zip code data is identical for both. However, one data record may contain city data for "Mountainview," while the other contains city data of "mountain view."

Software may tokenize both of the suspected user contact data records and determine that both contain the tokens "mountain" and "view" with minor differences between spacing and capitalization (Step 510). Contact administration software 310 may further compare the domain registration data 305 associated with each of the suspect records and determine that both contacts are associated with the same domain registration data 305 (Step 515).

Having established a need for clarification from the user to confirm that these are the same user contact data 300 and to request the user to select a single unique and independent user contact data 300 to be propagated throughout the system, contact administration software 310 may generate and transmit an alert requesting this clarification and input from the user (Step 520). As discussed below, such alerts may also be triggered by changes and/or differences between monitored user contact data 315 and stored user contact data 300.

The alert may be displayed via an email to the user associated with the user id, possibly using any email address stored in user data in data storage 230, or may be displayed to the user via the admin software or any other user interface available to the user.

The alert may comprise information explaining the need for action from the user. In this example, the information may comprise the user contact data 300 that is being compared, the similarities and/or the differences in the text strings of the respective user contact data 300 and/or the domain registration data 305 associated with the user contact data 300. In the embodiments below, the need for action from the user may be triggered by any change and/or difference between the user contact data 300 or the monitored user contact data 315.

In addition to the information explaining the need for action from the user, the alert may comprise a user interface comprising any user interface elements. As a non-limiting example, the user interface may comprise a listing of the user contact data 300 and the associated domain registration data 305. Each user contact data 300 may include a link, button, checkbox, radio button, dropdown, etc., allowing the user to select that user contact data 300 as the single unique and independent user contact data 300 selected by the user to be stored in data storage 230. It should be noted, however, that additional options may exist allowing the user to maintain multiple similar user contact data 300.

The user's selection(s) may then be transmitted from the client on which the user interface is displayed, to server(s) 210. Server(s) 210 may receive the user selection, and the selection, possibly including the association of the user contact data 300 with one or more or more domain name data 305 may be propagated throughout data storage 230 and/or throughout the system.

Thus, the user interface may comprise a one click solution, receiving a selection from the user and updating all selected instances of the user contact data 300 and/or any associated domain registration data 305. In other words, all instances of the selected contact data 300 may be associated with all instances of the selected domain registration data 305 throughout data storage 230, and vice versa. It should be noted again that these associations are not within individual data records themselves Rather, the data records for contacts and the data records for domain names exist independent of one another, but may be joined in the database.

In any of these embodiments presenting the contacts to the user via a user interface, any user contact data 300 that is not selected may be deleted, disregarded and/or disassociated generally, and/or may be disassociated with domain registration data 305 in data storage 230. This disassociation or deletion may also be propagated throughout data storage 230 or throughout the system.

In some embodiments, the user interface displayed on the client may include an option to defer this propagation for a length of time selected by the user. If the user is a large corporation, changes in contact information may signal changes indicating a location change and/or a fundamental strategy for the company. Contact administration software 310 may be configured to delay the propagation of the user contact data 300 and/or domain registration data 305 selected for a designated period of time so that the contact/domain registration change will not become generally known until desired.

In some embodiments, contact administration software 310 may determine a user contact data 300 with the most common usage and the user interface may present this most common usage as part of the alert, asking the user if this contact should be propagated throughout the database. The user may be presented a button or link allowing them to confirm, and if so, the contact may be propagated throughout the database and system, disassociating any non-selected contact as previously described.

Figure 8:
FIG. 8 is a illustrates a user interface in a possible embodiment of a method for ensuring accurate domain name contact information.
Figure 9:
FIG. 9 is a illustrates a user interface in a possible embodiment of a method for ensuring accurate domain name contact information.
Figure 10:
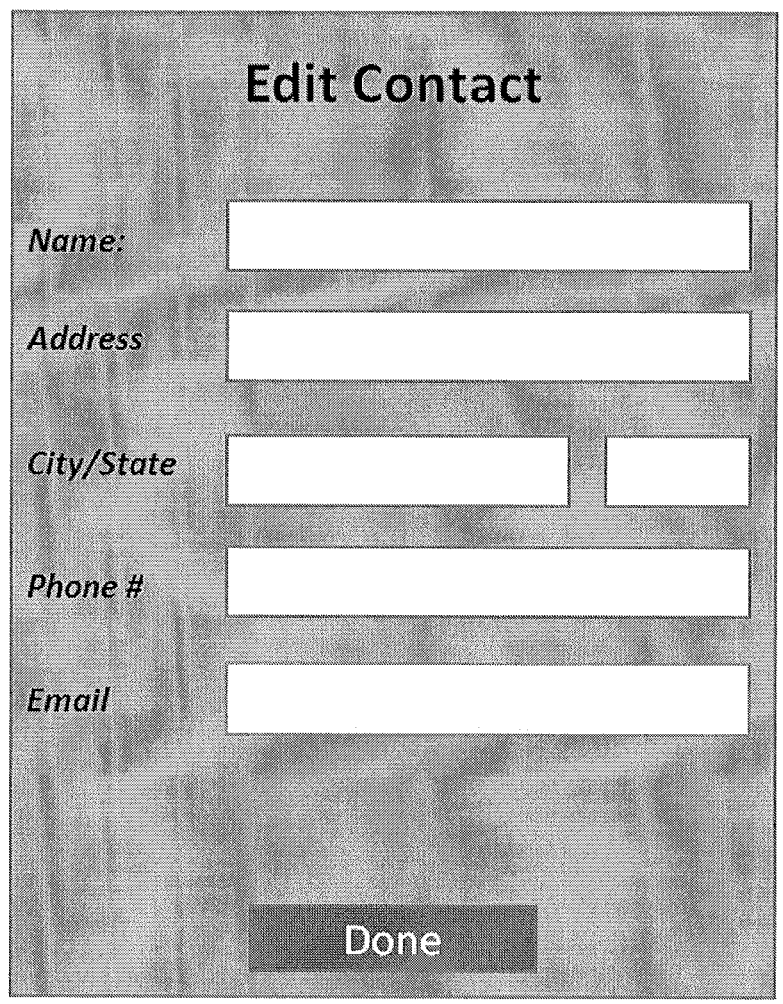
FIG. 10 is a illustrates a user interface in a possible embodiment of a method for ensuring accurate domain name contact information.

FIGS. 6-12 demonstrate a plurality of possible user interfaces in the disclosed embodiments. In the example interface shown in FIG. 6, a user may select the desired domains. In the example interface shown in FIG. 7, a user may select the types of contact types to be stored as unique and independent data in data storage 230. FIG. 8 demonstrates an example interface listing all contacts associated with the user in data storage, possibly via a user ID. This interface provides means for a user to select contacts and update them in data storage 230. FIG. 9 shows an example user interface for selecting contacts as above, with an additional feature for displaying the number of domains associated with each listed contact. The user may update this contact data and associated domain name data in data storage 230. FIG. 10 demonstrates an example user interface used to edit current contact information. As non-limiting examples, a user may add/edit a name, physical address, city, state, phone number and/or email address for the contact and update accordingly.

Figure 11:
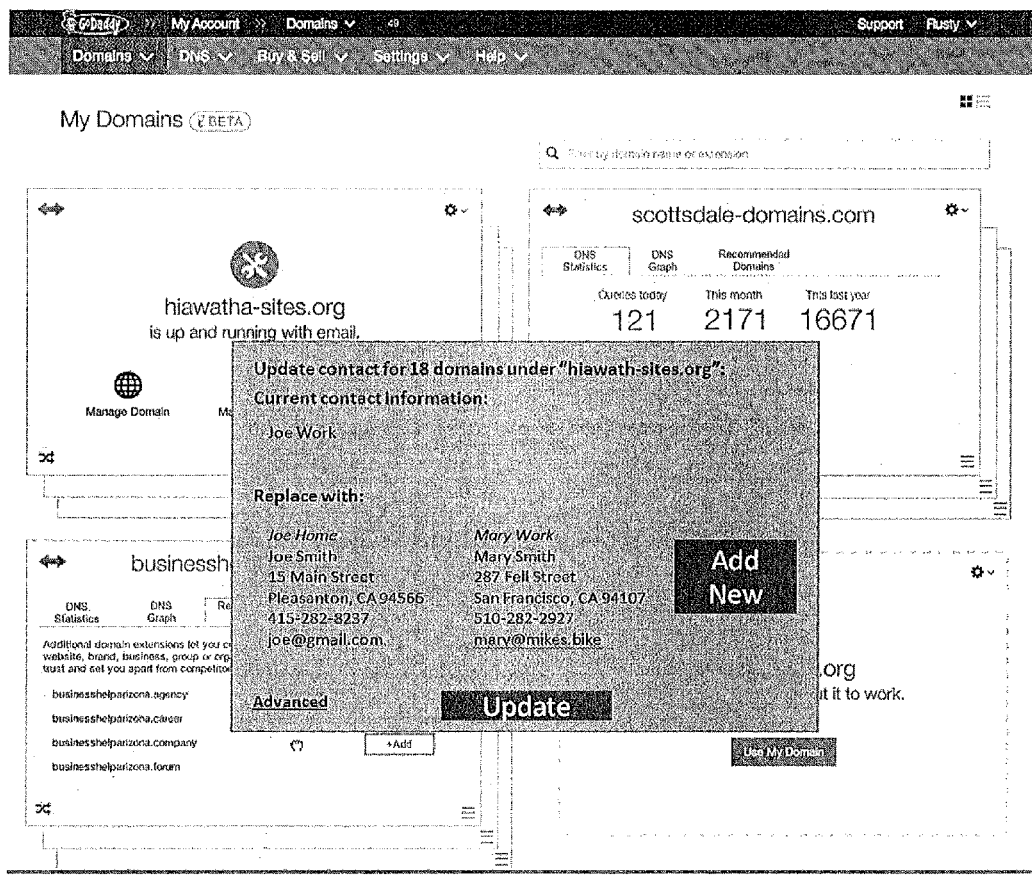
FIG. 11 is a illustrates a user interface in a possible embodiment of a method for ensuring accurate domain name contact information.
Figure 12:
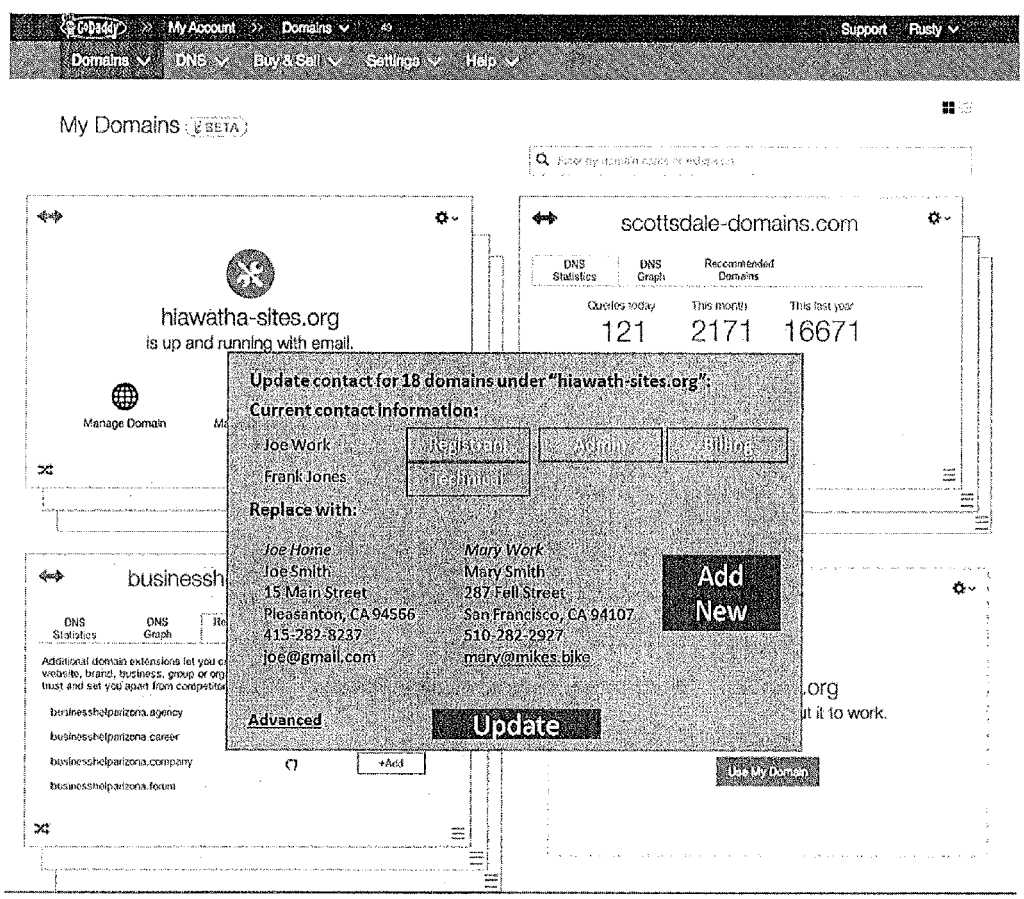
FIG. 12 is a illustrates a user interface in a possible embodiment of a method for ensuring accurate domain name contact information.

FIG. 11 is an example interface demonstrating contacts associated with multiple domains. This example interface provides means for a user to view, add, replace and/or otherwise update new contacts associated with one or more domain names. FIG. 12 is an example interface demonstrating similar features, but further displaying and/or allowing the user to update the type of contact (e.g., registrant, admin, billing, technical) associated with each contact for the one or more domain names.

Figure 13:
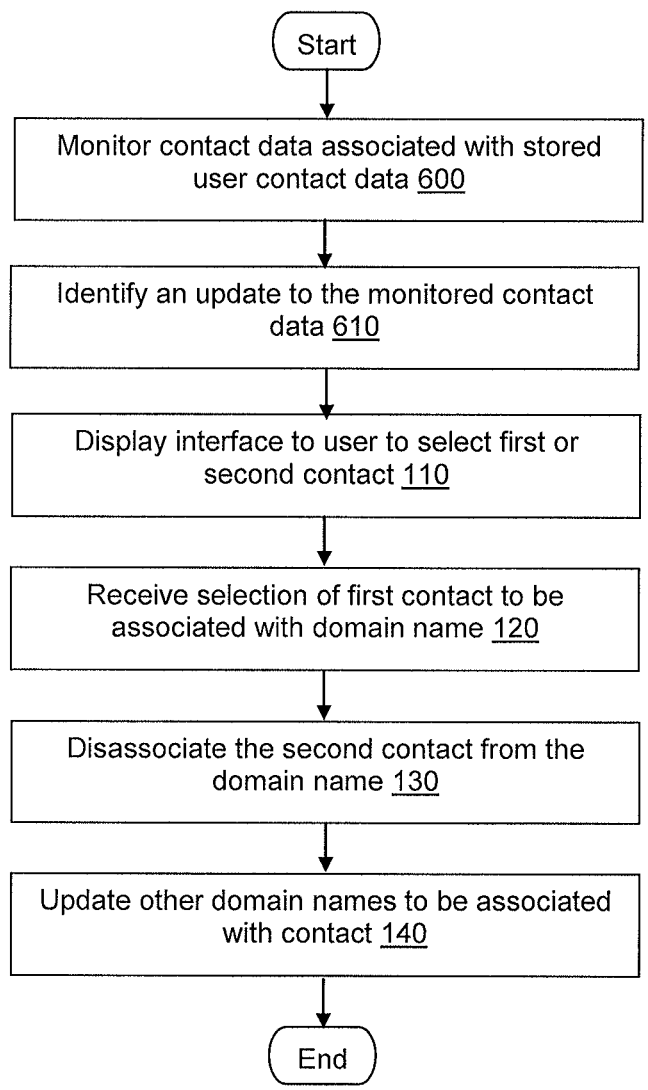
FIG. 13 is a flow diagram illustrating a possible embodiment of a method for ensuring accurate domain name contact information.

As seen in the non-limiting example embodiment in FIG. 13, the system may monitor several resources to ensure that the user contact data 300 stored in data storage 230 is synchronized with all monitored user contact data 315 external to the system (Step 1300), and may generate a request for user input if the monitored user contact data 315 changes (Step 1310). The system may generate notifications that the stored user contact data 300 does not match the external monitored user contact data 315 and ask the user to confirm, using the previously disclosed alert process, whether the stored contact data 300 or the external monitored user contact data 315 is the correct contact to be propagated throughout the system. As above, the alert may be displayed within an email or via any user interface, as non-limiting examples.

External monitored user contact data sources 315 may include social media contacts, HR contact data synchronized with the disclosed system, updates available through the US postal service (USPS) including various means of determining if customers have changed address, etc.

In some embodiments, the geographical location of the user or the user's organization may be verified using online mapping software. As non-limiting examples, Google Maps or Mapquest may provide street addresses and names of places (e.g., the storefront existed as of Nov. 9, 2014), possibly via an API similar to those described herein, so the address may be verified.

The social media information stored in association with user data in data storage 230, possibly associated with the user id, may be used to connect to a social media API, data stream and/or other network connection. This API or data stream may provide access to a monitored user contact data 315 associated with the user, possibly a business address for the social media account. As non-limiting examples, the social media API or data stream may access a monitored user contact data 315 from Facebook, Yelp, Google Listings, Locu Listings, etc.

The system may be alerted when this monitored user contact data 315 changes (Step 1310) or may otherwise regularly check to see if the monitored user contact data 315 for the social media matches the stored user contact data 300 in the system for the user. If not, an alert may be sent to the user to update the contact information, and the user may update the stored user contact data 300 as disclosed herein.

In some embodiments, a partnership with an organization's HR department or an API or other network data stream may be used to determine the contact information stored in a database for the HR department. This API or data stream may provide access to a contact data associated with the user, possibly including business contact data (e.g., technical, zone, billing, etc.) for the designated employees of the organization.

The system may be alerted when this monitored user contact data 315 changes (Step 610) or may regularly check to see if the user contact data 315 for the HR department matches the stored user contact data 300 for the user. If not, an alert may be sent to the user to update the user contact data 300, and the user may update the user contact data 300 as disclosed herein.

In the social media and HR database embodiments, as well as all other embodiments disclosed herein, the system may automatically update the user contact data 300 to match the monitored user contact data 315 without user interaction, so that the user contact data 300 is always synchronized in real time.

The system may synchronize the stored user contact data 300 with monitored user contact data 315 from the USPS to identify discrepancies in existing contacts or changes to the USPS contact data (Step 1310). This synchronizing may be accomplished via electronic means or by postal delivery methods.

Although the disclosed non-limiting example embodiments are specific to the USPS, no limitations should be made on the means through which a user's geographical location. As non-limiting examples, the verification could be made in person (e.g., courier, Uber driver, Taskrabbit, etc.). The user's geographical location could also be verified via any available commercial delivery services specializing in physical mail or package delivery (e.g., FedEx, UPS, etc.).

In addition, these commercial delivery services, as well as the services that use them, (e.g., Amazon, credit card companies) may further augment the functionality of the disclosed invention to provide a more granular verification of a user's geographical location, using any available proprietary tracking software, to identify name and address combinations for particular users, and may verify these names and addresses using the actions correlated to these names and addresses (e.g., signing for a package, calling in to verify a credit card number, voter registrations, etc.).

Electronic means for synchronizing postal information may comprise one or more APIs accessible via the USPS website/software that monitors a user's current physical address and any changes to their monitored user contact data 315. The administrator of the disclosed system may need to partner with the USPS to gain access to these resources.

Non-limiting examples of USPS APIs may include the USPS web tools API and the USPS ecommerce API. Additional USPS online tools may track changes for financial purposes, but may be modified to include any method steps disclosed herein. Any of these resources may be configured to alert the user and/or the disclosed system that: a user has changed their monitored user contact data 315; a user has requested that mail be forwarded to a different address than the monitored user contact data 315; and/or that mail sent to the monitored user contact data 315 has been returned, is undeliverable or has otherwise bounced.

Postal delivery methods may include sending a correspondence, possibly including an email, postcard and/or letter, via a certain level of USPS service, to a correspondence address stored in data storage 230, the monitored user contact data 315 and/or any other disclosed domain name record, and tracking its progress. If the correspondence is undeliverable, returned, forwarded or otherwise bounced, the user and/or system may be alerted that the stored user contact data 300, including the correspondence address, is no longer valid, and may generate an alert to the user via email or user control panel to confirm the correct address, as previously disclosed.

In embodiments such as those seen in FIG. 14, confirmation of the correspondence address may be used to verify the contact's physical geographical contact location, and may update the domain name record(s) to reflect this verification.

In some embodiments, user contact data 300 may use a privacy service, such as GoDaddy's DOMAINS BY PROXY. This service may list a registrar's contact information in domain name records, such as WHOIS records, DNS records, zone files and/or domain name related data records in data storage 230, in order to protect a registrant's privacy.

To avoid concerns with maintaining nexus requirements of a registry while still protecting user information privacy, the current system may verify the existence of a "physical store front" for the domain name contacts by generating a verification of the registrant's geographical location, including the correspondence address. The USPS embodiments described herein may confirm that the stored user contact data 300 listed is in fact a legitimate physical geographical location for the user.

As seen in FIG. 14, the disclosed software running on server(s) 210 may be configured to: generate a code to verify a correspondence address associated with a geographical contact location for a domain name registrant (Step 1400); store the code in data storage 230 in association with a domain name, possibly registered by the registrant (Step 1410); retrieve a correspondence address within a domain name record for the domain name (Step 1420); generate a correspondence to be sent to the correspondence address, including the code and a URL for accessing a user interface for entering the code (Step 1430); determine whether the code has been entered into the user interface (Step 1440); and if so, update the domain name record to include a status reflecting a verification of the correspondence address and a date of the verification (Step 1450).

In some embodiments, the correspondence may comprise a code used to verify a user's physical geographical contact location. This code may comprise a personal identification number (PIN) or a quick response (QR) code associated with a domain name registered to a registrant and/or may be associated with the registrant via the user's account. This code may be used to verify receipt of the correspondence by entering the code into the user interface displayed when the URL is entered into a browser, in order to confirm that the stored user contact data is correct, having been delivered to the correspondence address listed in the current domain name record(s). In some embodiments, the QR code may be scanned to confirm receipt of the correspondence.

In some embodiments, if the correspondence is tracked and the system determines, possibly via the disclosed APIs, that the correspondence was forwarded, the system may track the address that the correspondence was forwarded to, and may update the stored user contact data 300, including the correspondence address, and/or may confirm the address via sending an alert to the user to confirm the address as previously described.

In some embodiments, the correspondence may be dispatched in response to any detected update, change and/or any other contact data discrepancy between the monitored user contact data 315, the stored user contact data 300, and/or any other disclosed domain name records. The system may require that the user enter the code into the user interface found at the URL in order to confirm the stored user contact data 300, including the correspondence address, on record for that user. Contact administration software 310 may detect the discrepancy and automatically send the correspondence to the correspondence address. Until the code is entered into the user interface at the designated URL, contact administration software 310 may freeze any activity, or otherwise suspend the account associated with the suspect user contact data 300, including the correspondence address, in data storage 230.

In some embodiments, correspondence may be sent regularly to all contacts to confirm they are still current. If no code is received via the user interface at the designated URL, or if the correspondence is returned, undeliverable, forwarded and/or bounced, an alert as described above, as well as correspondence including the code and URL, may be sent to the user via any means to have the user update their user contact data 300.

The verification generated by the server(s) and displayed in the domain records may include a logo displayed in association with the domain name or contact (e.g., when displayed in a domain name aftermarket listing), or may include a verification of a certain contact within a domain-related record, such as a WHOIS record, a DNS record or a zone file, as non-limiting examples.

The updates to the domain-related record(s) may include a tag confirming the verified contact. This tag may comprise any additional text and may comprise a status of the contact data to be verified and the date of verification (e.g., "correspondence address verified Jan. 1, 2014") As another non-limiting example, a .nyc domain record may be updated to include a tag that reads "address in nyc verified," and include the date that the contact data was verified.

This process of verifying the user's correspondence address may be repeated at regular intervals (e.g., every year) and if the correspondence address is not verified, the status, as well as the tag may change to "pending verification." If the pending verification tag is in place for too long, the domain name may be put on an unverified status, and the user, registrar and/or registry may work together to get the domain name and/or contact data verified again for purposes of registry/registrar requirements such as a physical storefront for .nyc The steps included in the embodiments illustrated and described in relation to FIGS. 1-14 are not limited to the embodiment shown and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method, comprising the steps of:
executing, by a server hardware computing device coupled to a network and comprising at least one processor executing specific computer-executable instructions within a memory, a first database command selecting, from a database coupled to the network:
a first contact data within a first contact data record and a second contact data within a second contact data record each associated in the database with a user account identifier; and
at least one domain name within at least one domain name data record, associated in the database with the user account identifier;
identifying, by the server hardware computing device:
a character string common to the first contact data and the second contact data; and
at least one difference between the first contact data and the second contact data;
transmitting, by the server hardware computing device, to a client hardware computing device coupled to the network, a graphical user interface (GUI) displaying the first contact, the second contact, and the at least one domain name;
decoding, by the server hardware computing device:
a first user input, from at least one GUI selection control displayed on the client hardware computing device, indicating a selection of the first contact data in association with the at least one domain name; and
a second user input, from a GUI deselection control displayed on the client hardware computing device, indicating a deselection of the second contact data; and
executing, by the server hardware computing device, a second database command updating the database to:
associate the at least one domain name with the first contact data; and
disassociate the second contact data from the at least one domain name.

2. The method of claim 1, wherein the first contact data comprises a unique data record mapped to the at least one domain name.

3. The method of claim 1, wherein the second contact data comprises:
a new user contact data record generated by a user; or
a data record generated during a domain name registration or transfer and comprising a user contact data.

4. The method of claim 1, further comprising the steps of:
rendering, by the server hardware computing device, the GUI comprising:
a list of a plurality of contact data comprising the first contact data and the second contact data; and
a list of a plurality of domain names including the at least one domain name;
receiving, by the server hardware computing device, a selection via the GUI, comprising:
the first contact data; and
the at least one domain name.

5. The method of claim 1, wherein the first contact data comprises a social media contact data.

6. The method of claim 1, further comprising the step of generating, by the server hardware computing device, the GUI comprising the at least one difference and configured to receive the selection of the first contact data.

7. The method of claim 1, further comprising the steps of:
identifying, by the server hardware computing device, the user account identifier associated with the first contact data; and
associating, by the server hardware computing device, the at least one domain name with the user account identifier.

8. A system, comprising:
a database communicatively coupled to a network and storing, in association with a user account identifier:
  a first contact data within a first contact data record and a second contact data within a second contact data record;
  at least one domain name within at least one domain data record;
a server hardware computing device coupled to a network and comprising at least one processor executing specific computer-executable instructions within a memory, that, when executed, cause the system to:
  identify:
    a character string common to the first contact data and the second contact data; and
    at least one difference between the first contact data and the second contact data;
  transmit, to a client hardware computing device coupled to the network, a graphical user interface (GUI) displaying the first contact, the second contact, and the at least one domain name;
  decode:
    a first user input from at least one GUI selection control displayed on the client hardware computing device indicating a selection of the first contact data in association with the at least one domain name; and
    a second user input from a GUI deselection control displayed on the client hardware computing device indicating a deselection of the second contact data; and
  execute a second database command updating the database to:
    associate the at least one domain name with the first contact data; and
    disassociate the second contact data from the at least one domain name.

9. A method, comprising the steps of:
executing, by a server hardware computing device coupled to a network and comprising at least one processor executing specific computer-executable instructions within a memory, at least one database command storing in association, within a database communicatively coupled to the network:
  a user account identifier;
  a stored contact data stored in the database;
  a monitored contact data available through the network; and
  at least one domain name within at least one domain name data record;
responsive to the sever hardware computing device decoding an update to the monitored contact data, transmit, to a client hardware computing device coupled to the network, a graphical user interface (GUI) displaying the stored contact data and the monitored contact data;
decoding, by the server network computing device:
  a first user input from a GUI selection control displayed on the client hardware computing device indicating a selection of the monitored contact data to be associated with the at least one domain name; and
  a second user input from a GUI deselection control displayed on the client hardware computing device indicating a deselection of the stored contact data; and
executing, by the server hardware computing device, a second database command updating the database to:
  associate the at least one domain name with the monitored contact data; and
  disassociate the stored contact data from the at least one domain name.

10. The method of claim 9, wherein the monitored contact data comprises:
a social media contact data associated with a social media account; or
a postal contact monitored by a postal service.

11. The method of claim 10, wherein the postal contact comprises:
an application programming interface comprising a user address; or
a postcard or letter sent to the user address.

12. The method of claim 11, wherein the postcard or letter comprises a personal identification number to be entered into the GUI to verify the stored contact.

13. The method of claim 12, wherein, responsive to the update, the postcard or letter is sent to the user address.

14. The method of claim 13 further comprising the steps of:
sending the postcard or the letter to the user address at regular intervals;
responsive to the personal identification number being entered into the GUI, changing a status for the stored address to a verified status; and
responsive to the personal identification number not being entered into the GUI after a designated time period, changing the status for the stored address to a verification pending status.

15. The method of claim 14 further comprising the step of inserting the verification status into a domain name related record.

* * * * *